No. 607,421. Patented July 19, 1898.
L. C. BURGESS.
BRAKE BEAM.
(Application filed Dec. 30, 1897.)
(No Model.)
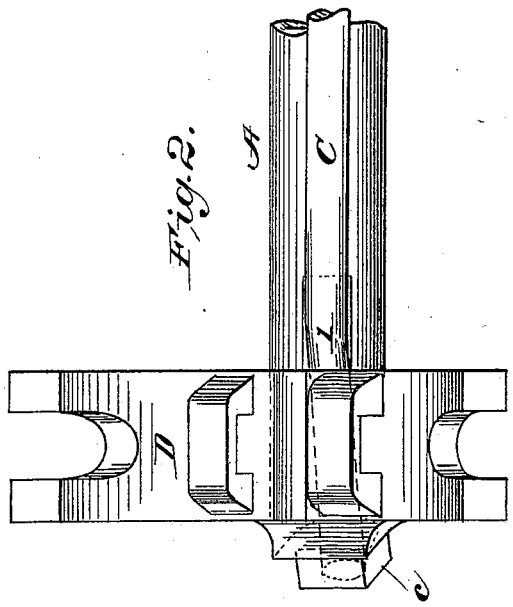
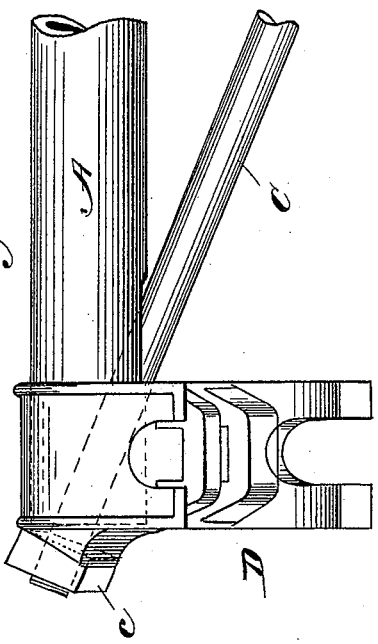
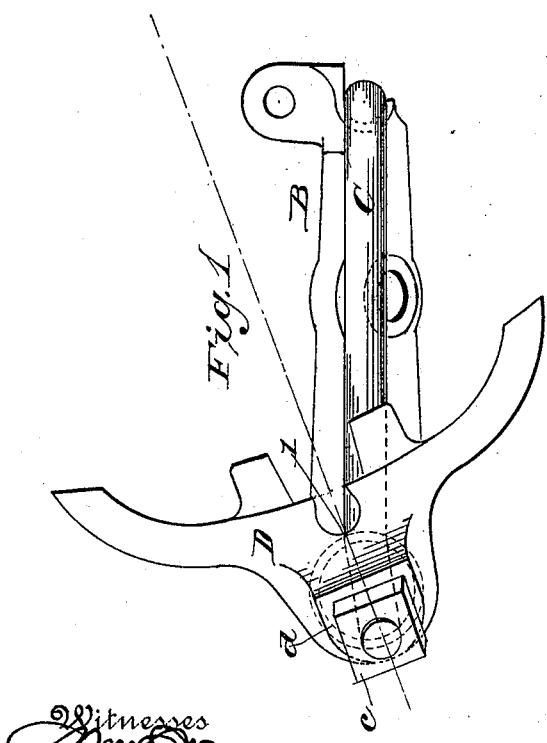
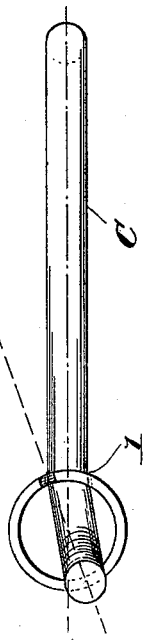

UNITED STATES PATENT OFFICE.

LUTHER C. BURGESS, OF CHICAGO, ILLINOIS, ASSIGNOR TO THE CHICAGO RAILWAY EQUIPMENT COMPANY, OF SAME PLACE.

BRAKE-BEAM.

SPECIFICATION forming part of Letters Patent No. 607,421, dated July 19, 1898.

Application filed December 30, 1897. Serial No. 664,563. (No model.)

*To all whom it may concern:*

Be it known that I, LUTHER C. BURGESS, a citizen of the United States, residing at Chicago, in the county of Cook, State of Illinois, have invented certain new and useful Improvements in Brake-Beams; and I hereby declare the following to be a full, clear, and exact description of the same, reference being had to the accompanying drawings, in which—

Figure 1 is an end view of a trussed brake-beam embodying my invention. Fig. 2 is a front view of one end of a brake-beam embodying my invention. Fig. 3 is a top or plan view of the portion of the beam shown in Fig. 2, and Fig. 4 is a diagram showing a portion of the truss-rod or tension member of the beam and the end of the compression member.

Like symbols refer to like parts wherever they occur.

My invention relates to the construction of that class of trussed metallic brake-beams wherein are combined a compression member, a strut or post, a tension member, and brake-heads or their equivalents, affording bearings for the tension-nut or like device which connects the parts and eliminates the slack from the structure.

The general construction of this class of beams involves a back or compression member A, a post or strut B, a tension member C, and brake-heads D D, having cup-sockets which receive the ends of the compression member A and through which the threaded ends of the tension member C pass, the whole secured by tension-nuts c or equivalent devices having their bearings or seats on the brake-heads.

In some constructions (see patent to P. Hien, No. 361,009, dated April 12, 1887) an end cap for the compression member is employed instead of a cupped head to receive the ends of the compression member A, and in other cases (see patent to H. B. Robischung, No. 453,739, dated June 9, 1891) an end cup or sleeve is interposed between the compression member A and the brake-head; but in every case, whether the seat or the tension-nut *c* be upon the brake-head, upon an end cap, or upon an end cup or sleeve, it is given such an inclination as to afford the tension-nut a bearing at a right angle to the line of the tension member C in order that the tension-nuts may set squarely home, and thus eliminate all slack from the structure so far as the same can be done without a "machine-finish."

In hanging trussed brake-beams the best results are obtained by keeping the beam (strut and tension member) parallel with the track, and when the brake-beam is hung "central"—that is to say, in the horizontal plane of the car-axle—the brake-head will constitute the arc of a circle whose radius is the strut. Consequently the inclined seat of the tension-nut *c* will be at right angles to the tension-rod and the nut will seat itself squarely or evenly; but in railway practice different roads hang the brake-beams at different heights above the track and below the car-axle, and wherever the beam is hung below the plane of the car-axle or "underhung," if the strut and tension-rod are to be maintained in a plane parallel with the track, the brake-head must be canted back (see Fig. 1 of the drawings) in order that the face of the shoe shall be concentric with the tread of the car-wheel when the brakes are applied. This position of the brake-head is termed the "throw," and its effect is to carry the inclined seat of the tension-nut *c* away from a right angle to the tension-rod C. Consequently the nut will not set squarely on its seat when screwed home, but will cant or bind at some points, the result of which is that the slack is not entirely eliminated from the structure. There is a constant tendency (especially during braking) to restore the brake-head to its central position, and the throw of the brake-head is materially and injuriously affected. In order to overcome these objectionable features of the brake-beam as at present constructed, it would be necessary either to provide a special brake-head, end cap, or sleeve (according to the particular construction of the beam) for each throw or every height above the track at which an under hung beam was suspended, which would be a very expensive matter, or else to provide an adjustable or rocking bearing-block for the nut, as set forth in an application of even date herewith, which results in an undesirable multiplication of small parts. I have, however, discovered that the result desired may be accomplished by imparting to the tension-rod C a slight bend or kink at or near the point where its end meets the compression member A, so that the ends of the tension member shall project in a plane diverging from the plane of the tension member and strut or post, the extent of said kink being regulated by the throw of the brake-head, and its direction with relation to the plane of the strut or post being such as to bring the axis of the end of the tension-rod into a plane at right angles to the plane of the inclined seat of the tension-nut, whereby the draft is rendered radial to the head or the brake-shoe and the torsion counteracted, and such a construction embodies the main feature of my present invention.

I will now proceed to describe my invention more fully by reference to the drawings, so that others skilled in the art to which it appertains may apply the same.

In the drawings, A indicates the compression member; B, the strut or post; C, the truss-rod or tension member; D, a brake-head, and c the tension-nut or equivalent means for holding the parts together and eliminating the slack from the structure, all of which in general character may agree with any of the several well-known forms of trussed metallic beam construction now in use, and for the element D, as shown, any equivalent which will afford a seat or bearing for the tension device c may be substituted at will, as the same forms no part of the present invention.

Upon the part D is formed a plane or seat d for the tension device c, said plane surrounding the opening through which the free end of the tension-rod C emerges when the parts are assembled.

The strut or post B and the main portion of the tension member C will be in the same plane, the angle at which said plane intersects the plane of the seat d of the tension device varying according to the "throw" of the brake-head D. Therefore in order that the face of the tension device or nut c may when in position on the end of the tension member C bear squarely on its seat d the tension-rod C is so deflected, preferably at l, where it meets the compression member and brake-head, as to pass through the seat d at a right angle to the plane thereof.

As a result of the construction hereinbefore set forth the tension device c may be set home, so as to take all slack from the structure and, if desired, to impart a camber to the compression member A. The draft on the brake-head will be radial thereto, (see dotted line, Fig. 1,) and the tension device c will rest squarely and bind uniformly on its seat or bearing, thus avoiding all tendency of the brake-head to return to a central position and insuring the maintenance of the throw given to the brake-head at the time the brake-beam is set up or assembled.

Having thus described my invention, what I claim, and desire to secure by Letters Patent, is—

1. In a trussed brake-beam, the combination of a compression member, a tension device, a bearing or seat for the tension device, and a tension member having a kink or deflection where it passes through the seat or bearing of the tension device the end of the tension member being in a plane diverging from that of the tension member and strut whereby the draft is rendered radial of the head, substantially as and for the purposes specified.

2. In a trussed brake-beam, the combination of a compression member, a tension member, a tension-nut, and a brake-head having an inclined seat for the tension-nut, the tension member having a bend or deflection where it meets the compression member and having its free end at right angles to the inclined seat of the tension-nut, substantially as and for the purposes specified.

In testimony whereof I affix my signature, in presence of two witnesses, this 27th day of December, 1897.

LUTHER C. BURGESS.

Witnesses:
E. T. WALKER,
JOHN M. YOUNG.